United States Patent [19]

Shimada et al.

[11] Patent Number: 5,451,775
[45] Date of Patent: Sep. 19, 1995

[54] APPARATUS FOR DETECTING GALVONMETER MIRROR MOVEMENT OF OPTICAL DISC TRACKING SERVO SYSTEM

[75] Inventors: Toshiyuki Shimada, Kadoma; Teruyuki Takizawa, Neyagawa, both of Japan

[73] Assignee: Matsushita Electric Industrial Co., Ltd., Osaka, Japan

[21] Appl. No.: 69,858

[22] Filed: Jun. 1, 1993

[30] Foreign Application Priority Data

May 29, 1992 [JP] Japan .................................. 4-138286

[51] Int. Cl.6 .................................................. G01D 5/30
[52] U.S. Cl. ............................... 250/230; 250/239; 369/44.14; 359/221
[58] Field of Search .................. 250/230, 235, 237 G, 250/239; 369/44.14, 44.11, 44.12, 44.32, 44.35, 112, 44.41; 359/221, 214

[56] References Cited

U.S. PATENT DOCUMENTS

| 4,152,588 | 5/1979 | Klah et al. ................. 250/230 |
| 4,330,880 | 5/1982 | Van Dijk . |
| 4,348,939 | 9/1982 | Hipp ............................. 250/230 |
| 4,423,496 | 12/1983 | Opheij et al. . |
| 4,466,088 | 8/1984 | Trethewey . |
| 4,556,964 | 12/1985 | Trethewey . |
| 4,564,757 | 1/1986 | LaBudde et al. . |
| 4,589,102 | 5/1986 | Volleau et al. ............. 369/44.32 |
| 4,736,353 | 4/1988 | Kasai et al. . |

FOREIGN PATENT DOCUMENTS

| 0055646 | 7/1982 | European Pat. Off. . |
| 0084727 | 8/1983 | European Pat. Off. . |
| 0447713 | 9/1991 | European Pat. Off. . |
| 2444314 | 7/1980 | France . |
| 64-59636 | 3/1989 | Japan . |
| 2086092 | 5/1982 | United Kingdom . |

*Primary Examiner*—Edward P. Westin
*Assistant Examiner*—Que T. Le
*Attorney, Agent, or Firm*—Ratner & Prestia

[57] ABSTRACT

A mirror movement detecting device includes a pivotable mirror, a pivotable mirror support member, a pivotable mirror drive unit, a reflecting plate secured to the pivotable mirror, a photo-sensing unit including a light emitting diode and two photosensors disposed in the vicinity of the reflecting plate, and a detecting circuit for controlling the light output detecting an output from the photo-sensing unit. Rays of light from the photo-sensing unit are reflected by the reflecting plate movable together with the pivotable mirror to provide the reflected light, the reflected light power is controlled by the photo-sensor output, the amount of which or a change in amount of which is subsequently detected to provide an indication of the amount of movement of the pivotable mirror at a high sensitivity and without accompanying an increase in mass of the pivotable mirror.

17 Claims, 9 Drawing Sheets

APPARATUS FOR DETECTING GALVONMETER MIRROR MOVEMENT OF OPTICAL DISC TRACKING SERVO SYSTEM

BACKGROUND OF THE INVENTION

1. Field of the Invention

The present invention generally relates to an optical disc player and, more particularly, to a galvanometer mirror drive for driving a galvanometer mirror for causing a light spot to track a recording track on an optical disc and a detecting system for detecting the amount of movement of the galvanometer mirror.

2. Description of the Prior Art

To accomplish a high speed access to an optical disc, it is getting a very important problem to reduce the weight of an optical head movable unit that is driven during the access. A system wherein a pivotable mirror (galvanometer mirror) supported on a fixed portion is used to accomplish a tracking control is considered an effective solution to this problem. For example, U.S. Pat. No. 4,330,880, issued May 18, 1982, discloses the use of a galvanometer mirror to accomplish a tracking thereby to achieve a high speed seeking. A pivotal mirror drive device which is an important element in accomplishing this tracking control is disposed in an optical disc player on a path extending from a semiconductor laser to an optical disc medium where a light spot is formed so that, when the mirror is pivoted, the light spot can be moved in a direction perpendicular to a recording track on the optical disc.

This known pivotable mirror drive device comprises a leaf spring member, a galvanometer mirror pivotally supported by a housing through the leaf spring member, a drive coil secured to the leaf spring member and a permanent magnet secured to the housing so as to confront the drive coil. When an electric current flows across the drive coil, the drive coil receive an electromagnetic force from the permanent magnet to permit a movable unit, comprised of the drive coil, the leaf spring member and the pivotable mirror, to move. With this system it is possible to move reflected rays of light of the laser beam radiated towards the pivotable mirror and, therefore, the tracking control in the optical disc player can be realized. The tracking control of the light spot by the galvanometer mirror is accomplished by a control of movement of an optical axis along which the rays of light reflected from the pivotable mirror travel, and a mechanical vibratory system in which the pivotable mirror is supported by the leaf spring member is a major element decisive of a tracking servo performance.

U.S. Pat. No. 4,423,496, issued Dec. 27, 1983, discloses the use of a mirror position detecting device which comprises a reflecting plate secured to a back face of the galvanometer mirror and a photo reflector including a light emitting diode and two photodiodes and fixed at a position confronting the reflecting plate such that a pattern of intensity distribution of rays of light reflected from the reflecting plate when the rays of light from the light emitting diode impinge upon the reflecting plate can be moved above the two photodiodes thereby to detect the position of the mirror. According to this reference, an output signal from the mirror position detecting device is utilized as a correction signal with which a position control loop is operated to accomplish a highly stable tracking control servo.

Since the accuracy of tracking control depends on the accuracy of detection of the position of the pivotable mirror, various devices utilizing light have been suggested for detecting the amount of movement of the pivotable mirror. For example, U.S. Pat. No. 4,466,088, issued Aug. 14, 1984, discloses the use of a second reflecting mirror on one side adjacent a reflecting face of the galvanometer mirror to cause monitoring rays of light to be reflected sequentially by the second reflecting mirror, then by the reflecting face of the galvanometer mirror and finally by the second reflecting mirror before a change in amount of light so reflected can be detected. For this mirror position detecting device, various devices have been suggested.

Any one of U.S. Pat. No. 4,556,964, issued Dec. 3, 1985, and U.S. Pat. No. 4,564,757, issued Jan. 14, 1986, discloses an attempt to increase the detection sensitivity of an optical system for a mirror position detection by suppressing interference between the light beam, used for information recording or reproducing, and the light beam used for the position detection.

However, with any of the prior art structures discussed above, there is a problem in that the number of optical component part is so large as to result in an increase of the cost of manufacture. The detection sensitivity required form the detection of amount of movement of the mirror may be expressed in tern of a change in angle of the mirror. For example, to achieve the tracking control in the optical disc player, it is generally required that the amount of movement of the light spot allowed against the track of about 1.6 $\mu$m in width is not greater than 0.1 $\mu$m and the amount of movement of the pivotable mirror required in such case is about 0.1° at maximum with the signal-to-noise ratio not lower than 40 dB. In other words, the detection sensitivity of 0.001 degree or greater is required, and it has long been considered difficult to achieve such a high sensitivity angle detection.

SUMMARY OF THE INVENTION

The present invention is therefore intended to provide a mirror movement detecting device which comprises a pivotable mirror; a mirror support member for pivotally supporting the pivotable mirror; a fixed unit to which the mirror support member is fixed; a drive unit for driving the pivotable mirror; a reflecting plate movable together with the pivotable mirror for providing the reflecting light; a photo-sensing unit including a light emitting diode and a photosensor and fixedly secured to the fixed unit while spaced a slight distance from and generally parallel to the reflecting plate; and a detecting circuit for controlling the light output detecting a photosensor output of the photo-sensing unit.

According to the present invention, a light output from the light emitting diode of the photo-sensing unit is projected onto a portion of the pivotable mirror or the mirror support member to provide reflected light which is subsequently received by the photosensor. The detecting circuit controls the drive current of the light emitting diode so as to make the received light to the photosensors close to a predetermined value, detects and outputs the amount of the reflected light or a change in amount thereof.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Hereinafter, a mirror movement detecting device according to a preferred embodiment of the present invention will be described in detail with reference to the drawings.

Figure 1A:
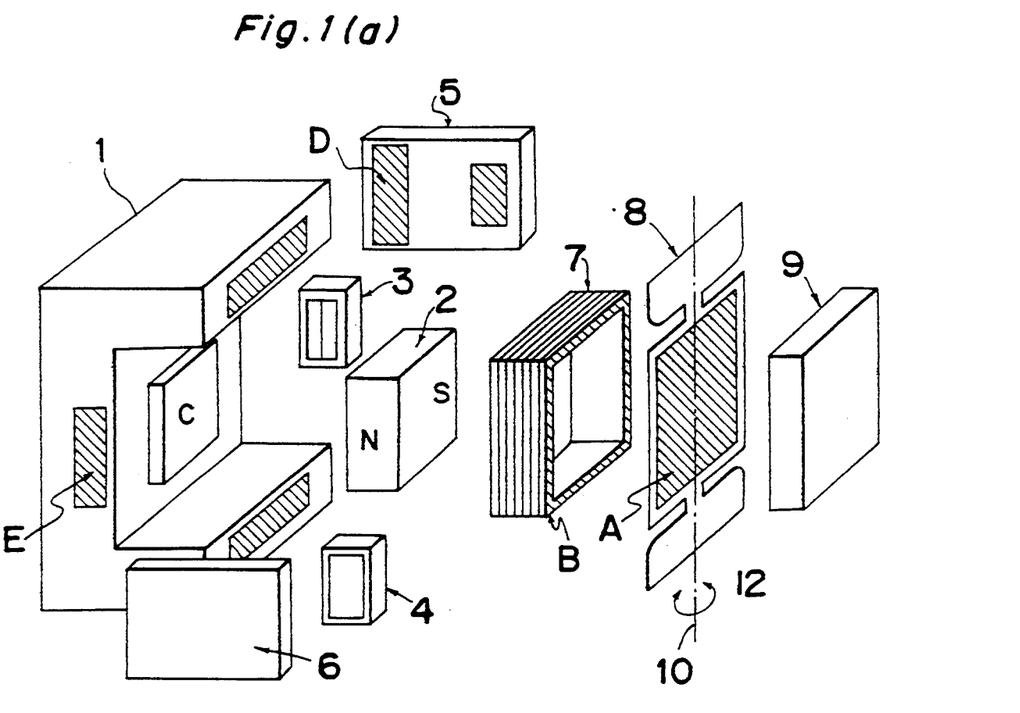
FIG. 1(a) is a schematic exploded view of an essential portion of a mirror movement detecting device according a first preferred embodiment of the present invention.
Figure 1B:
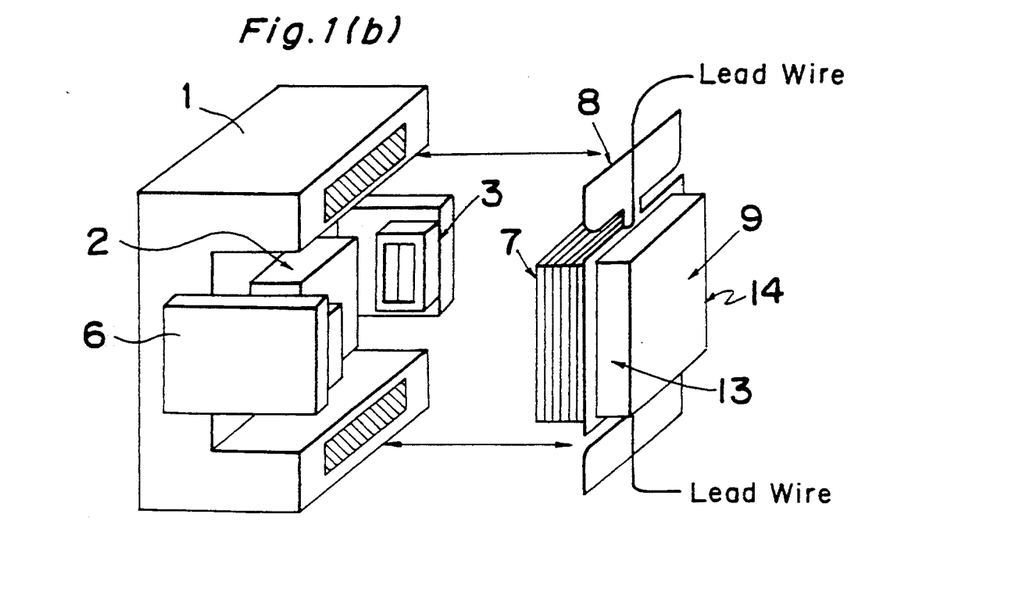
FIG. 1(b) is a schematic exploded view of the mirror movement detecting device according to the first preferred embodiment of the present invention.
Figure 2A:
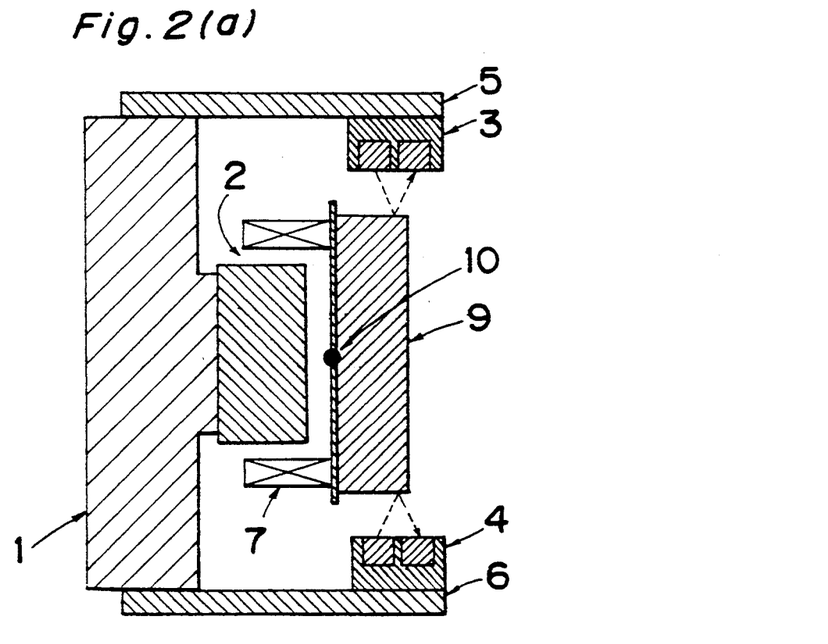
FIG. 2(a) is a sectional view of the mirror movement detecting device shown in FIG. 1, with a pivotable mirror held at a neutral position.
Figure 2B:
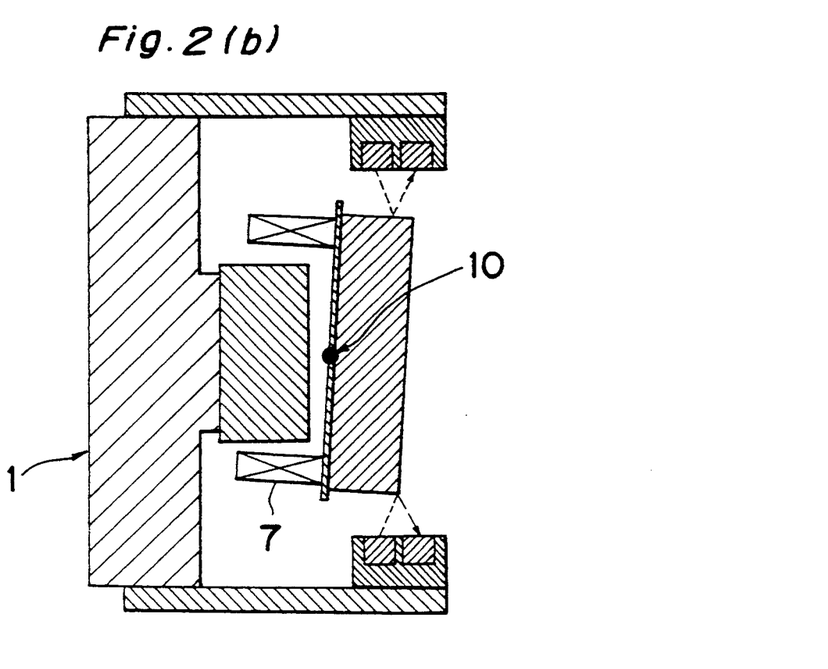
FIG. 2(b) is a view similar to FIG. 2(a), showing the pivotable mirror pivoted.

Referring first to FIGS. 1 and 2, reference numeral 1 represents a housing; reference numeral 2 represents a permanent magnet; reference numerals 3 and 4 represent photo-sensing units; reference numerals 5 and 6 represent respective photo-sensing unit support members; reference numeral 7 represents a coil; reference numeral 8 represents a leaf spring; reference numeral 9 represents a pivotable mirror; reference numeral 10 represents an axis of pivot of the pivotable mirror; reference numeral 12 represents the direction in which the pivotable mirror 9 is pivoted; and reference numerals 13 and 14 represent reflecting faces defined in opposite ends of the pivotable mirror which concurrently serve as reflecting plates, respectively. The permanent magnet 2 and the coil 7 form a movable unit or actuator, and the leaf spring 8 and the housing 1 form a fixed unit. The leaf spring 8 is a member for pivotally supporting the pivotable mirror 9, and the pivotable mirror 9 is normally biased to occupy a neutral position by the action of a restoring force of the leaf spring 8. In FIG. 1(a), for the sake of brevity, lead wires of the coil 7 are not shown, but it is necessary to secure these lead wires to the fixed unit as connecting lines through which an electric drive current can be supplied to the coil and, accordingly, because of the presence of the lead wires, a pivoting characteristic exhibited by the leaf spring may vary. This is lessened by disposing the lead wires so as to extend along the axis of rotation of the leaf spring 8 thereby to avoid an influence which may be brought on a pivoting characteristic of the pivotable mirror due to the layout of the lead wires.

Figure 3:
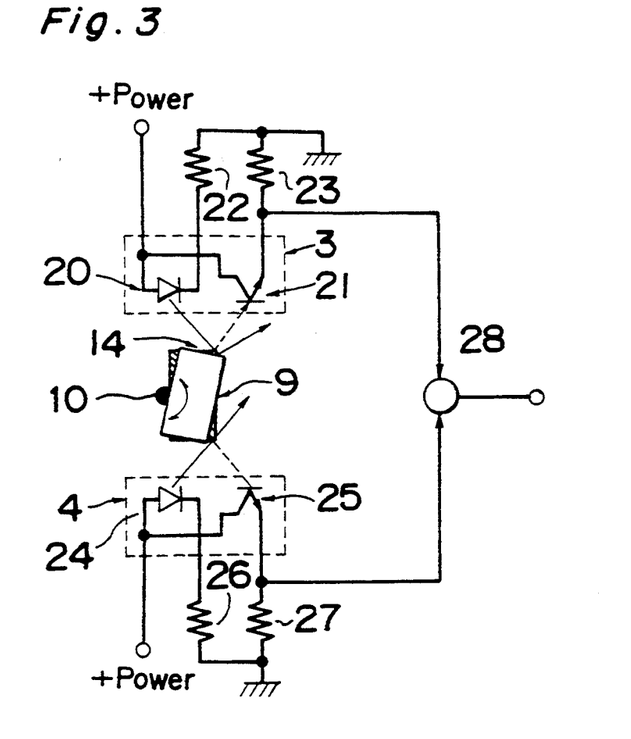
FIG. 3 is an electric circuit diagram showing a detecting circuit used in the mirror movement detecting device of FIG. 1.

Referring to FIG. 3, reference numerals 20 and 24 represent light emitting diodes; reference numerals 21 and 25 represent respective phototransistors; reference numerals 22, 23, 26 and 27 represent respective resistors; and reference numeral 28 represents a subtractor.

Referring to FIG. 4, reference numeral 29 represents respective a light emitting diode, and reference numerals 30 and 31 represent respective phototransistors forming associated photo-sensors. The light emitting diode 20 and the photo-transistor 21 constitute the photo-sensing unit, whereas the light emitting diode 29 and the phototransistors 30 and 31 constitute the photo-sensing unit 3.

Figure 6:
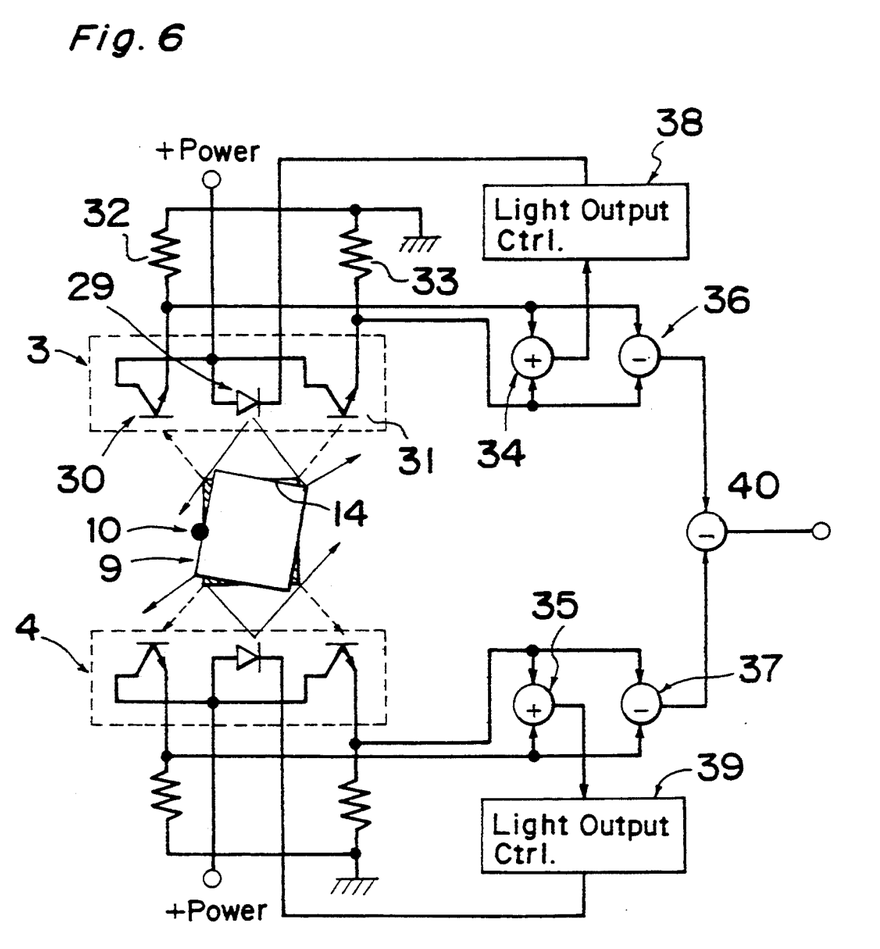
FIG. 6 is an electric circuit diagram showing a modified form of the detecting circuit used in association with any one of the variants shown in FIGS. 4(c) and 4(f)
Figure 7A:
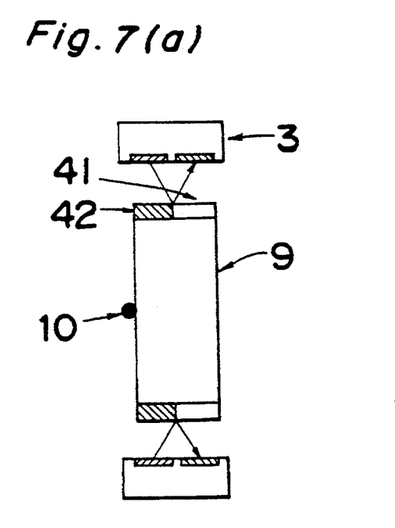
FIGS. 7(a) and 7(b) are schematic side views showing respective modified forms of the reflecting plates and the mirror support member.
Figure 7B:
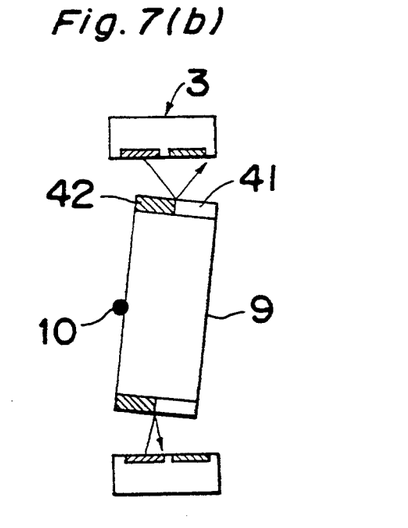
Figure 7C:
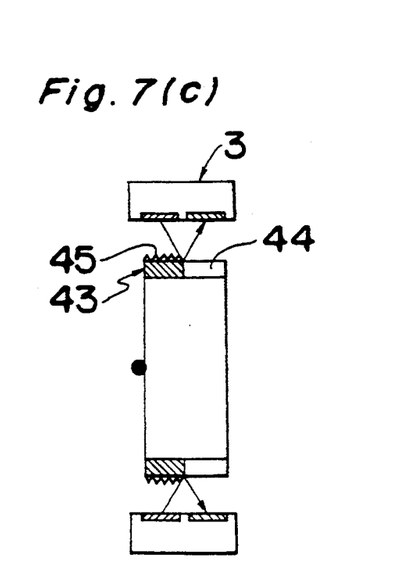
FIGS. 7(c) and 7(d) are schematic side views showing respective further modified forms of the reflecting plates and the mirror support member.
Figure 7D:
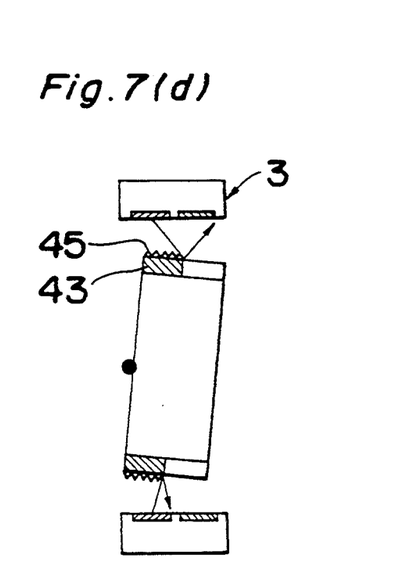

In FIG. 6, reference numerals 32 and 33 represent respective resistors; reference numerals 36 and 39 represent light output controllers; reference numerals 34 and 35 represent respective adders; and reference numerals 36, 37 and 40 represent respective subtractors.

In FIG. 7, reference numeral 41 represents a reflecting plate made of material having a high reflectivity; reference numeral 42 represents a reflecting plate made of material having a low reflectivity; reference numeral 43 represents a reflecting plate; reference numeral 44 represents a face shaped portion of high reflectivity; and reference numeral 45 represents a face shaped portion of low reflectivity.

The operation of the mirror movement detecting device of the above described construction will now be described with particular reference to FIGS. 1 to 5.

The leaf spring 8, which is a mirror support member, has an area A, hatched in FIG. 1(a), to which the pivotable mirror 9 is bonded, and also has a rear area to which an area B of the coil 7 is bonded. The housing 1 has a projection C to which the permanent magnet 2 is bonded, the photo-sensing unit support member 5 having the photo-sensing unit 3 bonded thereto and the photo-sensing unit support member 6 having the photo-sensing unit 4 bonded thereto are bonded at respective areas D tightly to respective areas E of the housing 1. The mirror actuator is constituted by the coil 7 and the permanent magnet 2, and the pivotable mirror 9 is pivoted in a direction of pivot about the axis of pivot 10 by the effect of an electromagnetic force which is produced when the drive current is supplied across the coil 7 through the lead wires. The lead wires are so disposed as to extend along the leaf spring 8 as shown in FIG. 2(b) so that physical spring characteristics of the lead wires will not substantially adversely affect the pivotal movement of the pivotable mirror 9. The pivotable mirror 9 has a size of 5×7×1.5 mm and undergoes a pivotal movement over about 3 milliradian so that a light spot formed on an optical disc can be moved a distance of 5 μm. Respective distances between the reflecting faces 13 and 14 and the photo-sensing units 4 and are chosen to be about 0.8 mm.

Figures 4A, 4B:
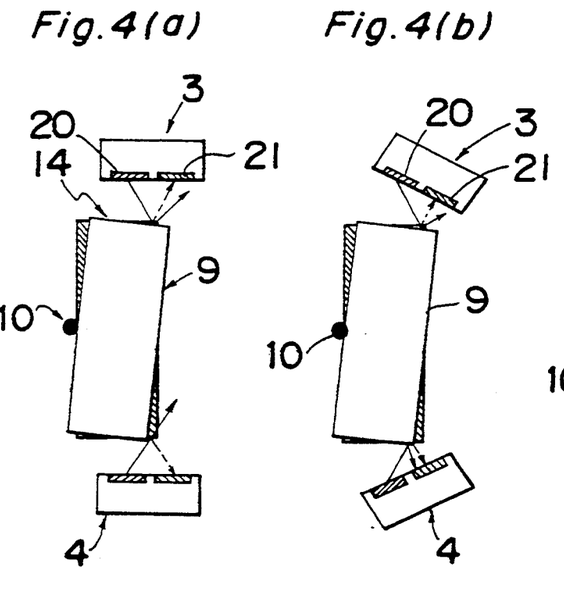
FIGS. 4(a) to 4(f) illustrate various manners in which a mirror support member including a reflecting plates, and a photo-reflector are arranged.
Figure 4C:
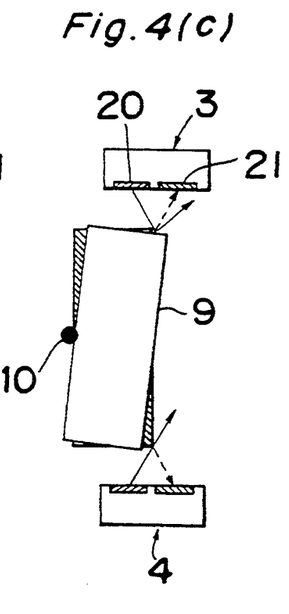
Figures 4D, 4E:
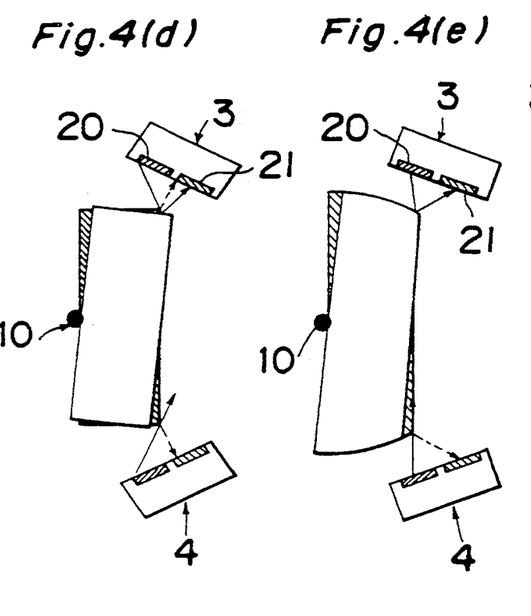

The photo-sensing units 3 and 4 are constituted by the light emitting diodes.20 and 24 and the phototransistors 21 and 25, respectively, and the light emitting diodes emit rays of light when a suitable drive current is supplied to the light emitting diodes 20 and 24 from a positive power source through the resistors 22and 26. Light outputs from the light emitting diodes 20 and 24 are subsequently reflected by the reflecting faces 13 and 14. The reflected light from the reflecting faces 13 and 14 are received by the respective phototransistors 25 and 21 which convert them into electric currents which are subsequently taken as associated voltages by means of a positive power source and the corresponding resistors 23 and 27. The voltage signals so obtained are variable with a change in amount of the reflected light incident to a pivotal motion of the pivotable mirror and are therefore indicative of the position of the pivotable mirror. In FIG. 4(a), when the pivotable mirror is held at the neutral position, almost of all of the light output from the light emitting diode 20 is reflected by the reflecting face 14 and is then received by the phototransistor 21, the amount of the light received by the phototransistor 21 being variable with the pivotal motion of the pivotable mirror. As far as a detection output incident to the amount of movement of the pivotable mirror is concerned, the amount of the reflected light received is maximum when the pivotable mirror is held at the neutral position as shown by a curve (a) in FIG. 5. The characteristic in which the amount of the reflected light received attains a maximum value at the neutral position of the pivotable mirror is inconvenient to a pivotable mirror position detecting characteristic. Where as shown in FIG. 4(b) generally rectangular opposite end faces of the pivotable mirror are utilized as respective reflecting faces and the photo-sensing units are disposed so as to confront, but be inclined at an angle relative to, the reflecting faces, the angle of reflection of the reflected light varies with the pivotal movement of the pivotable mirror and, therefore, the amount of light incident on a light receiving portion of each photo-sensing units varies to exhibit such a detection characteristic shown by a curve (b) in FIG. 5. Also, in (c), a vignetting of the reflected light which takes place when the pivotable mirror is pivoted, while one end of the reflecting faces of the pivotable mirror in the neutral position is aligned with a center line of the corresponding photo-sensing unit, is utilized and, in such case, such a characteristic as shown by a curve (b) in FIG. 5 can be realized as is the case with (b). Again, in (d), arrangement has been made to combine the respective detecting characteristics of (b) and (c) to provide a high sensitive detection. (e) illustrates an arrangement in which each reflecting face is so shaped as to occupy a portion of the cylinder coaxial with the axis of pivot so that any possible influence brought about by a change in angle of reflection of the reflected light is minimized to achieve the detection relying on the vignetting of the reflected light. During the above described operation, the respective detection outputs from the photo-sensing unit 3 and 4 are opposite characteristics relative to the pivotal movement of the mirror, and the subtractor 28 shown in FIG. 3 is a simplified subtractor which can be in the form of an operational amplifier or the like and is operable to output a difference between respective outputs emerging from the resistors 23 and 27.

Figure 4F:
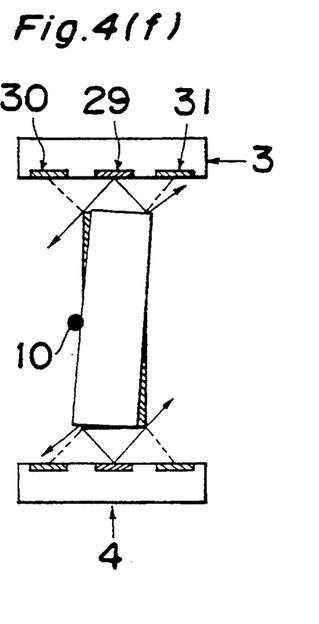
Figure 5:
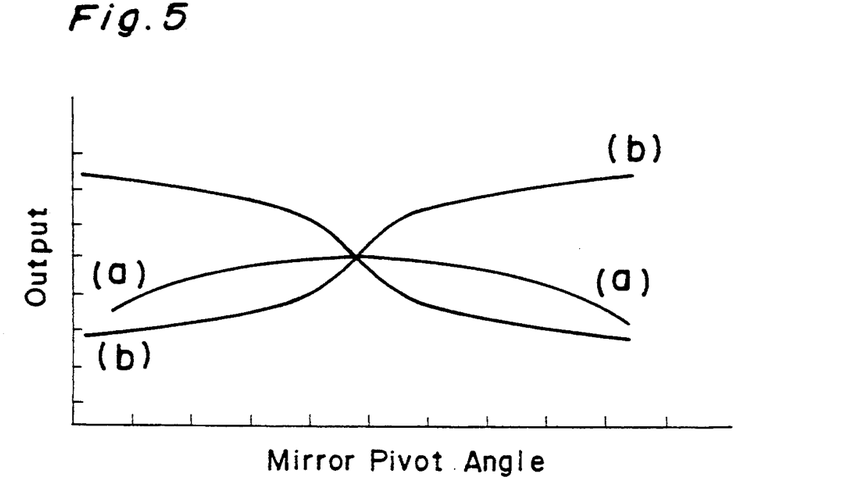
FIG. 5 is a graph showing a relationship between the position of the pivotable mirror and an output from a detecting circuit.

Furthermore, although in FIGS. 4(a) to 4(d), reference has been made to the use of each photo-sensing unit including the single light emitting diode and the single phototransistor with a portion of the reflecting face, each photo-sensing unit may include one light emitting diode and two photo-transistors and two areas of the reflecting surface such as shown in FIG. 4(f).

FIG. 6 illustrates a modification of the detecting circuit. In this figure, the adders 34 and 35 and the subtractors 26 and 27 are simplified adders and simplified subtractors, each of which may be employed in the form of an operational amplifier or the like, and are operable to provide a sum of and a difference between signals, which have been converted into respective voltages by means of the above described resistors, thereby to provide a light output signal and a mirror position detection signal. Reference numerals 38 and 39 represent light output controllers operable to control the drive current for the light emitting diodes of the associated photo-sensing units 3 and 4 so as to allow the respective outputs from the adders 34 and 35 to assume a predetermined value. Each light output controller 38 and 39 is constituted by a subtractor capable of giving a difference between an input signal and the above described predetermined value and a voltage-to-current converter for effecting a voltage-to-current conversion of a subtracted value outputted from the subtractor. According to the system shown in FIG. 6, the detecting characteristic exhibited by the assembly of the light emitting diode 29, a portion of the reflecting face 14 and the phototransistor 31 and that of the assembly of the light emitting diode 20, a portion of the reflecting face 14 and the phototransistor 30 are opposite to each other. With this construction, by detecting the output of the light emitting diode 29 by means of the phototransistors 30 and 31, not only can the output from the light emitting diode be stabilized, but also noises represented by a drift in light output from the light emitting diode can be minimized.

According to the foregoing construction, a change in amount of the reflected light resulting from a movement of the reflecting face can be detected and, consequently, the amount of movement of the pivotable mirror can be determined. Also, since the end faces of the pivotable mirrors are utilized as the reflecting faces, the number of necessary component parts can advantageously be minimized. Where the reflecting plates are employed, they may not be fitted to the pivotable mirror, but they may be fitted to the mirror support member and, also, a portion of the leaf spring which forms the mirror support member may be utilized as a reflecting plate.

It is to be noted that the detection sensitivity in detecting the mount of movement of the pivotable mirror depends on the shape and reflectivity of the reflecting face, the amount of movement, the light output and noise of the light emitted from the light emitting diode, noises of the photo-transistors and others. Since as described above, the neighbors of the opposite ends of the pivotable mirror or the mirror support member are defined at a position remotest from the axis of pivot, the amount of movement of the reflecting faces for a given angle of change is relatively great making it possible to achieve a high sensitive detection. Thus, the mirror movement detecting device of the present invention considerably differs from the prior art device in that the pivotable mirror or the opposite ends of the mirror supporting member are utilized to provide a high sensitive feature.

So far as shown in FIGS. 1 to 3, the use has been made of the reflecting faces 13 and 14 and the photo-sensing units 3 and 4 confronting the reflecting faces 13 and 14, respectively, so that the amount of movement of the pivotable mirror can be detected by these two separate means. Therefore, by securing the difference of the detection outputs from these two means, the signal-to-noise ratio can be improved. In other words, while the intensity of the reflected light incident to the movement of the pivotable mirror is detected so as to have a correlation with the detected voltage, correlations among noises of various elements are so small as to make it possible to improve the signal-to-noise ratio by about 3 dB by subtraction.

FIG. 4 illustrates various arrangement of the reflecting plates and the photo-sensing units. Specifically, FIG. 4(a) illustrates an example utilizing a phenomenon in which the angle of the rays of light reflected from the reflecting face 14 varies with rotation of the mirror support member 8 which in turn results in a change in amount of light received by the phototransistor 21. According to the arrangement shown in FIG. 4(a), since the output is maximum when the mirror support member 8 is held at the neutral position, and gradually decrease as the pivotable mirror 9 is pivoted, a detection directional characteristic will not lie in one direction with respect to the direction of pivot. However, the detection sensitivity will lie in one direction with such an arrangement as shown in FIG. 4(b). In an arrangement shown in FIG. 4(c), a change in amount of the reflected light is detected in terms of a change in amount of vignetting which takes place when, while the rays of light emitted from the light emitting diode are vignetted by an end of the reflecting face, the reflecting face undergoes a generally parallel motion accompanying the rotation of the mirror support member. Arrangement shown in FIG. 4(d) is such that the change in amount of the received light with the angle of the reflecting face is detected simultaneously with the vignetting of the emitted light which takes place upon a generally parallel motion of the reflecting face, thereby making it possible to achieve a high sensitivity feature. Furthermore, arrangement may be made that, while the reflecting face is so curved about the axis of pivot as to suppress a change in angle of the reflecting face shown in FIG. 4(e), only a change in the vignetting of the emitted rays of light can be detected. In the case of the arrangement shown in FIG. 4(e), it is clear that the linearity of the detection sensitivity relative to the pivotal motion can be increased.

While in the foregoing description reference has been made to the use of the pair of the reflecting plates and the pair of the photo-sensing units, this system is basically effective to provide the high signal-to-noise ratio of the detection output. Specifically, in the system of FIGS. 4(b), 4(c), 4(d) and 4(e) the respective detection outputs are in phases opposite to each other and, therefore, when these detection outputs are subtracted by the subtractor 28, an increase in signal-to-noise ratio is possible.

Figure 8A:
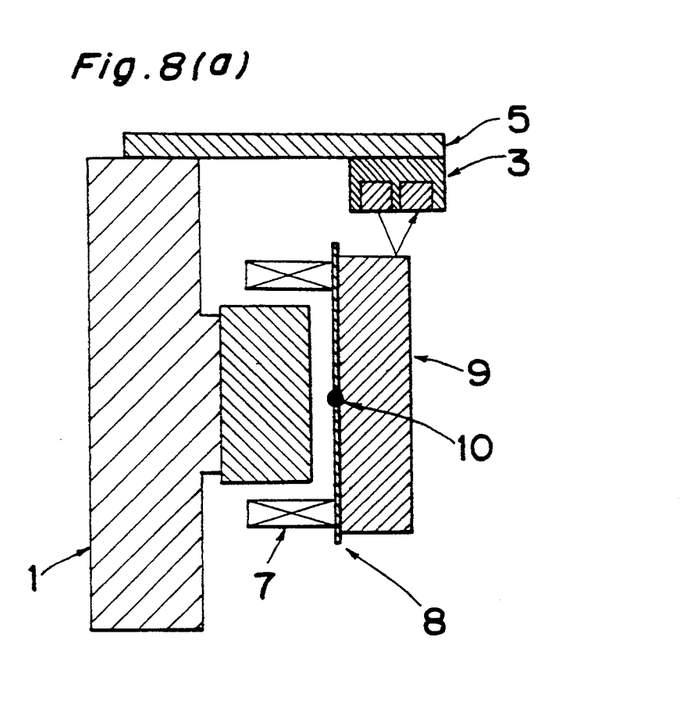
FIG. 8(a) is a schematic side view of the mirror movement detecting device according a second preferred embodiment of the present invention wherein a single photo-sensing unit is employed and the pivotable mirror is shown as held at the neutral position.
Figure 8B:
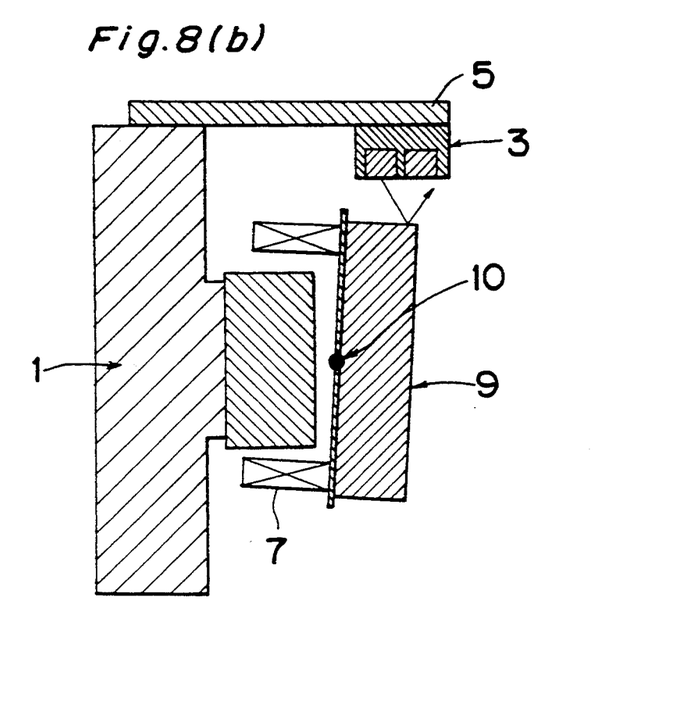
FIG. 8(b) is a view similar to FIG. 8(a), showing the pivotable mirror pivoted.
Figure 9:
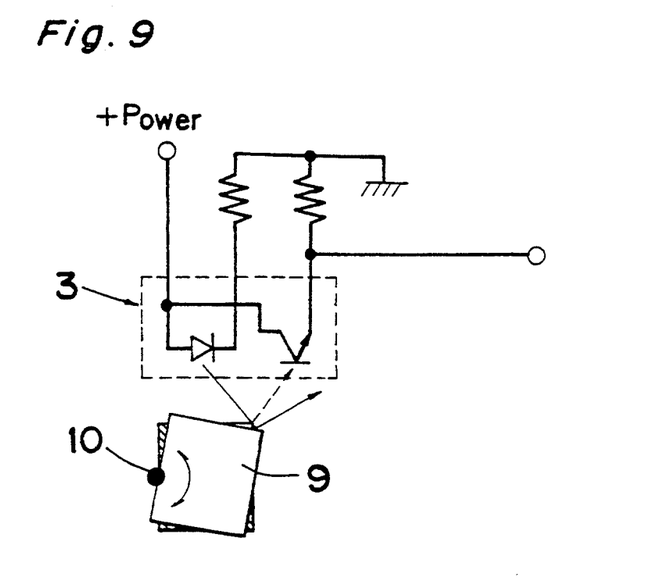
FIG. 9 is an electric circuit diagram showing the detecting circuit used in the;embodiment of FIGS. 8(a) and 8(b)
Figure 10A:
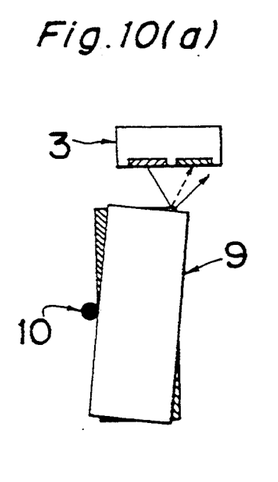
FIGS. 10(a) to 10(f) illustrate various manners in which a mirror support member including a reflecting plates, and a photo-sensing unit are arranged, which can be employed where the single photo-sensing unit is employed.
Figure 10B:
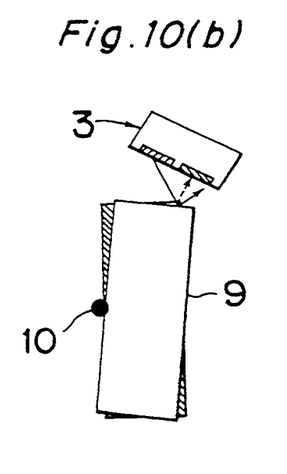
Figure 10C:
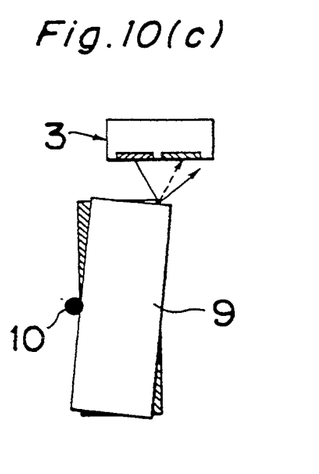
Figure 10D:
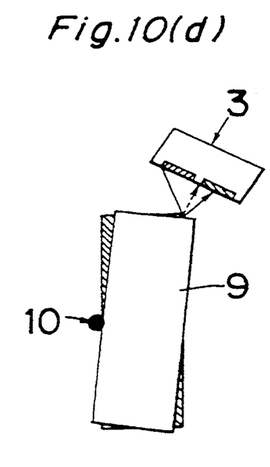
Figure 10E:
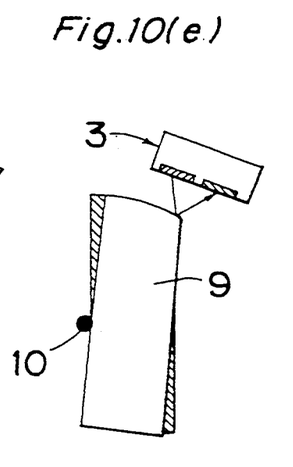
Figure 10F:
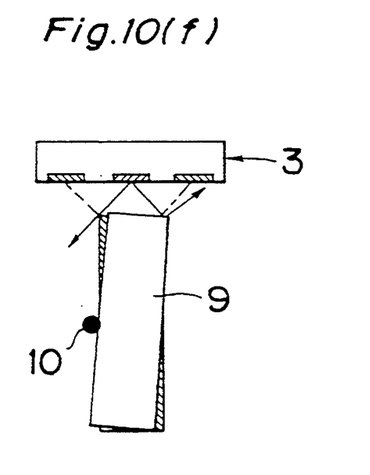
Figure 11:
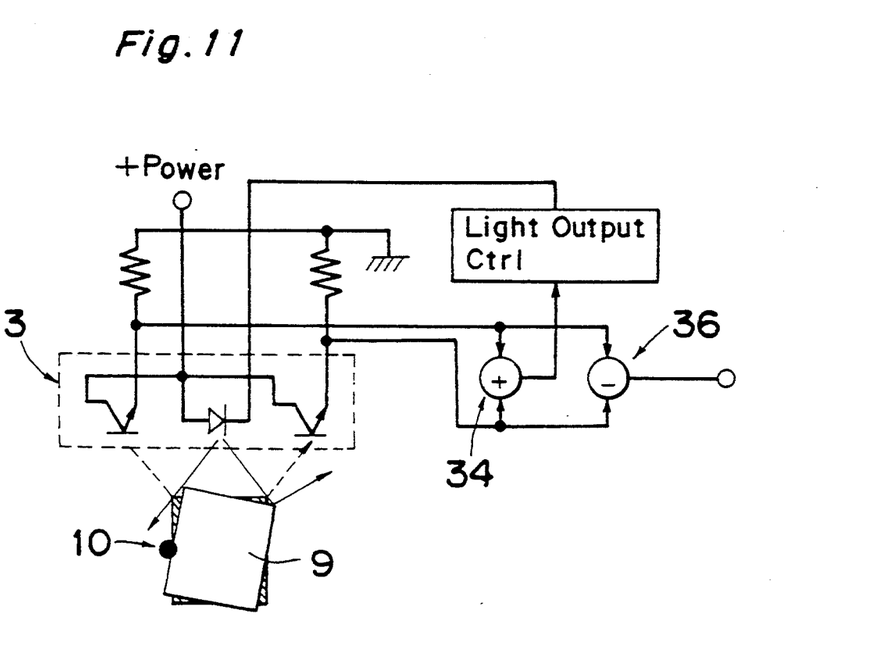
FIG. 11 is an electric circuit diagram showing the detecting circuit employed in the second preferred embodiment of the present invention.

In contrast thereto, in the system shown in any one of FIGS. 8, 10, and 11, only one reflecting plate and one photo-sensing units are employed, making the structure very simple. The operation thereof is substantially the same except that the detection of the amount of movement of the pivotable mirror is carried out at only one end of the pivotable mirror, and FIGS. 8, 9, 10 and 11 correspond respectively to FIGS. 2, 3, 4 and 6.

While it is needless to say that, considering the shape and the arrangement of the reflecting faces and the associated photo-sensing units, various modifications are possible, one example of which is shown in FIG. 7.

Referring to FIG. 7, there is shown the reflecting plate and the photo-sensing units made of material having different reflectivities and having reflecting faces of different shapes. In the case of FIG. 7(a), the reflecting plate is made of material 41 of high reflectivity and material 42 of low reflectivity, and the amount of the rays of light reflected from the reflecting face 9 can be considerably varied to accomplish a high sensitivity feature. Similarly, in the case of FIG. 7(c), a similarly high sensitivity feature is achieved by employing the reflecting plate 43 having its surface made up of a shape 44 of high reflectivity and a shape 45 of low reflectivity. FIGS. 7(b) and 7(d) are similar to FIGS. 7(a) and 7(c), respectively, but showing the pivotable mirror being pivoted in relation to the photo-sensing units.

As hereinbefore described, according to the present invention, by the provision of the reflecting plates movable together with the pivotable mirror, the photo-sensing units each including the light emitting diode fixed exteriorly so as to confront the reflecting plates and the photosensors for receiving rays of light reflected from the reflecting plates, and a detector unit for detecting respective outputs from the photosensors of the photo-sensing units, the amount of movement of the pivotable mirror can be detected. Thus, a high sensitive detection of the amount of movement of the pivotable mirror is possible.

Although as a defect of the present invention, a direct current drift of the detection result appears to be considerable, where the detection result of the amount of movement of the pivotable mirror as a speed feed-back servo, not as a position feed-back servo such as described in connection with the prior at system is employed for the tracking control servo, a direct current-like position of the position of the pivotable mirror itself is unnecessary and a mere detection of a change in amount of movement of the pivotable mirror suffices, making it possible to detect the amount of movement of the pivotable mirror at a high sensitivity with a simplified construction. Also, with this method, the mirror support member for the support of the pivotable mirror is constituted by a pivotable support system afforded by the leaf spring and, therefore, the neutral position of the pivotable mirror is imparted by the restoring force of the leaf spring.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A mirror movement detecting device which comprises:
   a pivotable mirror;
   a mirror support member for pivotally supporting the pivotable mirror;
   a fixed unit to which the mirror support member is fixed;
   a drive unit for driving the pivotable mirror;
   a reflecting plate having at least one reflecting face and pivotable together with the pivotable mirror;
   a first reflective photo-sensing unit fixedly secured to the fixed unit while spaced a slight distance from and generally parallel to the reflecting plate, said photo-sensing unit including
      a light emitting diode which emits rays of light to be reflected off said at least one reflecting face and
      two photosensors for receiving and converting said reflected rays of light into output signals;
   and a detecting circuit for detecting a photosensor output of the photo-sensing unit including
      a light output controller for controlling a drive current for the light emitting diode to provide a sum of the output signals from the two photosensors which is a predetermined value and
      a subtractor to output the difference of said output signals wherein said difference indicates the amount of movement of the pivotable mirror.

2. The mirror movement detecting device as claimed in claim 1, wherein said reflecting plate comprises a pair of reflecting faces each disposed symmetrically with a plane perpendicular to said pivotable mirror and parallel to an axis of pivot of said pivotable mirror,
   and further comprising a second reflective photo-sensing unit is fixedly secured to the fixed unit and spaced a slight distance from and generally parallel to said reflecting plate.

3. The mirror movement detecting device as claimed in claim 1, wherein said at least one reflecting face of said reflecting plate is of a shape curved to follow a curvature coaxial with an axis of pivot of the pivotable mirror.

4. The mirror movement detecting device as claimed in claim 2 wherein said pair of reflecting faces of said reflecting plate is of a shape curved to follow a curvature coaxial with an axis of pivot of the pivotable mirror.

5. The mirror movement detecting device as claimed in claim 1 or 2, wherein the reflecting plate is made of a plurality of dissimilar materials or a plurality of different reflecting face shapes.

6. The mirror movement detecting device which comprises:
   a pivotable mirror;
   a mirror support member for pivotally supporting the pivotable mirror;
   a fixed unit to which the mirror support member is fixed;
   a drive unit for driving the pivotable mirror;
   a reflecting plate having at least one reflecting face and pivotable together with the pivotable mirror;
   a first reflective photo-sensing unit including a light emitting diode and two photosensors said photo-sensing unit being fixedly secured to the fixed unit while being spaced at least several hundred microns from and generally parallel to the reflecting plate, said photo-sensing unit including
      a light emitting diode which emits rays of light to be reflected off said at least one reflecting face and
      two photosensors for receiving and converting said reflected rays of light into output signals;
   and a detecting circuit including
      a light output controller for controlling a drive current for the light emitting diode to provide a sum of the output signals from the two photosensors which is a predetermined value and
      a subtractor to output the difference of said output signals wherein said difference indicates the amount of movement of the pivotable mirror.

7. The mirror moving detecting device as claimed in claim 6, wherein said reflecting plate comprises a pair of reflecting faces each disposed symmetrically with a plane perpendicular to said pivotable mirror and parallel to an axis of pivot of said pivotable mirror,
   and further comprising a second reflective photo-sensing unit fixedly secured to the fixed unit and spaced at least several hundred microns from and generally parallel to the reflecting plate.

8. The mirror moving detecting device as claimed in claim 6, wherein said reflecting face is of a shape curved to follow a curvature coaxial with an axis of pivot of the pivotable mirror.

9. The mirror moving detecting device as claimed in claim 6, wherein said photo-sensor is disposed as to detect a change in amount of reflected light resulting from a vignetting of output light of the photo-sensor by the reflecting plate.

10. The mirror moving detecting device as claimed in claim 6, wherein said photo-sensor is disposed as to detect a change in amount of reflected light resulting from a change in angle of an optical axis resulting from a movement of the reflecting plate.

11. The mirror moving detecting device as claimed in claim 6, wherein said photo-sensor is disposed to detect changes in the amount of reflected light resulting from a vignetting of output light of the photo-sensor by the reflecting plate and in the amount of reflected light resulting from a change in angle of an optical axis resulting from a movement of the reflecting plate.

12. The mirror moving detecting device as claimed in claim 9, wherein said reflecting face comprises at least two dissimilar materials.

13. The mirror moving detecting device as claimed in claim 9, wherein said reflecting face comprises at least two different reflecting face shapes.

14. The mirror moving detecting device as claimed in claim 10, wherein said reflecting face comprises at least two dissimilar materials.

15. The mirror moving detecting device as claimed in claim 10, wherein said reflecting face comprises at least two different reflecting face shapes.

16. The mirror moving detecting device as claimed in claim 11, wherein said reflecting face comprises at least two dissimilar materials.

17. The mirror moving detecting device as claimed in claim 11, wherein said reflecting face comprises at least two different reflecting face shapes.

* * * * *

UNITED STATES PATENT AND TRADEMARK OFFICE
CERTIFICATE OF CORRECTION

PATENT NO. : 5,451,775
DATED : September 19, 1995
INVENTOR(S) : Shimada et al.

It is certified that error appears in the above-indentified patent and that said Letters Patent is hereby corrected as shown below:

On the title page, item [54] and column 1, line 2, "GALVONMETER" should be --GALVANOMETER--.

Column 9, line 64, between "photosensors" and "said" insert a comma --,--.

Signed and Sealed this

Nineteenth Day of March, 1996

Attest:

BRUCE LEHMAN

*Attesting Officer*     *Commissioner of Patents and Trademarks*